United States Patent [19]

Meschkat et al.

[11] Patent Number: 4,829,562
[45] Date of Patent: May 9, 1989

[54] RECEIVER FOR DETECTING DIFFERENT FIXED FREQUENCY SIGNALS ON A TELEPHONE TRUNKLINE

[75] Inventors: Peter Meschkat, Waiblinger; Katalin Grafl, Stuttgart, both of Fed. Rep. of Germany

[73] Assignee: Alcatel N.V., Amsterdam, Netherlands

[21] Appl. No.: 92,066

[22] Filed: Sep. 2, 1987

[30] Foreign Application Priority Data

Sep. 2, 1986 [DE] Fed. Rep. of Germany ....... 3629907

[51] Int. Cl.$^4$ .................. H04M 3/22; H04M 7/00
[52] U.S. Cl. .................. 379/235; 328/138; 379/282; 379/386
[58] Field of Search ............ 379/235, 287, 282, 115, 379/386, 286; 328/138

[56] References Cited

U.S. PATENT DOCUMENTS

| | | | |
|---|---|---|---|
| 4,076,965 | 2/1978 | Olsen et al. | 379/282 |
| 4,385,208 | 5/1983 | Tow | 379/484 |
| 4,502,049 | 2/1985 | Atlsiuson | 340/825.73 |
| 4,614,909 | 9/1986 | Jarofalt | 328/140 |
| 4,626,629 | 12/1986 | Premoli et al. | 379/386 |

FOREIGN PATENT DOCUMENTS 3343646  6/1985  Fed. Rep. of Germany .

Primary Examiner—Thomas W. Brown
Attorney, Agent, or Firm—Christie, Parker & Hale

[57] ABSTRACT

A signalling receiver has its signal input (E) connected to a central-office trunk (a, b) in a trunk junctor and includes a variable bandpass filter (BP) connected to a clock line (TL). The signal input (E) is connected via an attenuator (DG) to a variable high-pass filter (HP) which is connected to the clock line (TL) and, via a signal evaluation and conversion unit (SE), to the bandpass filter (BP). A bandwidth switch (BU) is connected to the clock line (TL), the variable bandpass filter (BP), and the attenuator (DG). The cutoff frequency of the high-pass filter (HP) and the midband frequency of the bandpass filter (BP) are adjusted with a clock signal having a frequency related to the signal frequency to be received, the cutoff frequency being lower than the midband frequency.

6 Claims, 2 Drawing Sheets

4,829,562

RECEIVER FOR DETECTING DIFFERENT FIXED FREQUENCY SIGNALS ON A TELEPHONE TRUNKLINE

TECHNICAL FIELD

The present invention relates to a signalling device in a telecommunications system and more particularly to a signalling receiver which utilizes a variable bandpass filter whose midfrequency is adjusted in accordance with the frequency of a clock signal.

BACKGROUND ART

A typical prior art signalling receiver is disclosed in published German patent application DE-OS No. 33 43 646, which discloses a line signal analyzer in which the 'a' and 'b' wires of a telecommunications exchange line are connected through RC networks to a differential amplifier whose output is fed to a bandpass filter which is clocked from an adjustable clock generator. In that prior art arrangement, a band filter passing only the signal frequency to be received is implemented with a so-called switched-capacitor filter. In this manner, all signal frequencies to be received can be detected with a single filter and the respective midband frequency may be adjusted by a clock frequency applied over a clock line.

DISCLOSURE OF INVENTION

The technical problem to be solved by the invention is to reliably receive different frequency AC voltage signals on central-office trunks under all operating conditions.

In accordance with the present invention, the signalling receiver's signal input is connected via an attenuator to a variable high-pass filter. The high-pass filter in turn is connected to the clock line and via a signal evaluation and conversion unit to a variable bandpass filter, so that, since the high-pass filter and the bandpass filter are fed with the same clock signal, the cutoff frequency of the high-pass frequency is always at the same relative distance from the midband frequency of the bandpass filter, with the cutoff frequency being lower than the midband frequency. A bandwidth switch is connected to the clock line, the variable bandpass filter, and the attenuator.

A significant advantage of such an arrangement is that all noise voltages at frequencies below the AC voltage signal to be received are filtered out, since the high-pass filter is adjusted with the same clock frequency as the bandpass filter. Moreover, if 16-kHz metering pulses are to be received, the high-pass filter will also filter out the simultaneously applied voice signal. Furthermore, a square-wave signal of constant amplitude and of the same frequency as the received signal is constantly provided by the signal evaluation and conversion unit to the bandpass filter independent of noise voltages and attenuations on the central-office trunk, so that reliable reception is ensured at all times.

BRIEF DESCRIPTION OF DRAWINGS

An embodiment of the invention will now be explained with reference to the accompanying drawings, in which.

BEST MODE FOR CARRYING OUT THE INVENTION

Figure 1:
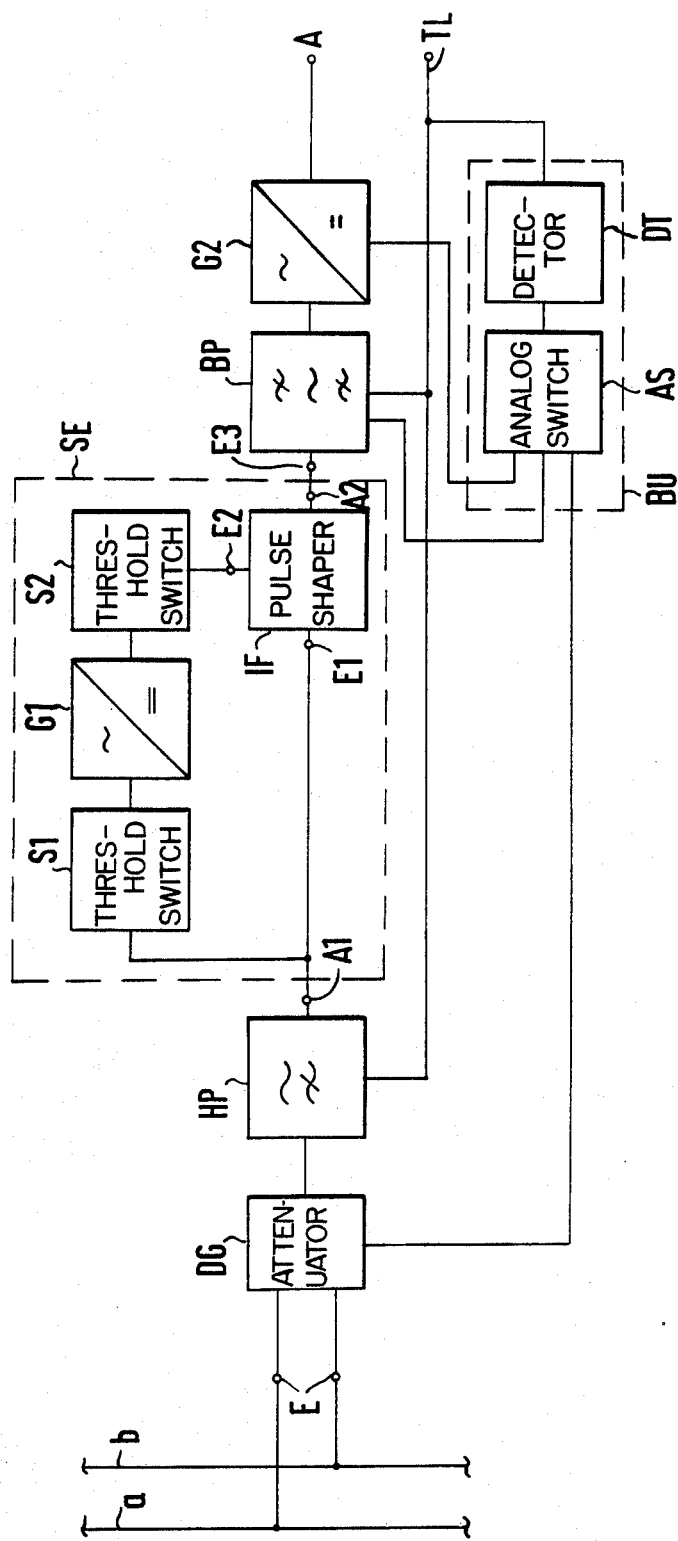
FIG. 1 is a block diagram of the signalling receiver in accordance with the invention.

The signalling receiver shown in FIG. 1 has its signal input E connected to a central-office trunk a, b of a trunk junctor. The signal input E is connected via an attenuator DG to a variable high-pass filter HP, and a signal output A1 of the high-pass filter HP is connected via a signal evaluation and conversion unit SE to a variable bandpass filter BP. The high-pass filter HP and the bandpass filter BP are also connected to a clock line TL, so that the cutoff frequency of the high-pass filter and the midband frequency of the bandpass filter can be adjusted by means of a clock signal whose frequency has a fixed relationship to the signal frequency to be received. Since the high-pass filter HP and the bandpass filter BP are fed with the same clock signal, the cutoff frequency of the high-pass filter HP is always at the same relative distance from the midband frequency of the bandpass filter BP, the cutoff frequency being lower than the midband frequency. Such variable filters are implemented to advantage with so-called switched-capacitor filters.

As can be seen in FIG. 1, the signal evaluation and conversion unit SE consists of a switchable pulse shaper IF and a series combination formed by a first threshold switch S1, a first rectifier G1, and a second threshold switch S2. The switch output A1 of the high-pass filter HP is connected to a first input E1 of the pulse shaper IF and, via said series combinations, to a second input E2 of the pulse shaper IF. An output A2 of the pulse shaper IF is connected to a signal input E3 of the variable bandpass filter BP.

A bandwidth switch BU is connected to the clock line L, the variable bandpass filter BP, and the attenuator DG. It contains a clock-frequency detector DT, which is connected to the clock line TL, and an analog switch array AS, which is connected to the clock-frequency detector DT. The analog switch array AS is also connected to the variable bandpass filter BP and the attenuator DG. Depending on the clock frequency detected by the clock-frequency detector DT, resistors of the bandpass filter BP and resistors of the attenuator BG are switchable for adjusting corresponding bandwidths and attenuation factors, respectively.

A signal output of the variable bandpass filter BP is connected to a second rectifier G2, whose signal output forms an output A of the signalling receiver. The second rectifier G2 is connected to the analog switch array AS, so that the time constant of the second rectifier G2 is adjustable in accordance with the clock frequencies detected by the clock-frequency detector DT.

The operation of the signalling receiver in accordance with the invention will now be described for the case where AC signals with frequencies of 425/450 Hz dial tone/busy tone for an outgoing call
25/50 Hz ringing tone/clear-back signal for an incoming call, and
16 kHz for metering pulses during an outgoing call have to be received.

For an outgoing call, i.e., 425/450 Hz, a clock frequency related to this frequency is applied over the clock line TL to the variable bandpass filter BP and the variable high-pass filter HP, so that the filters are adjusted to a cutoff frequency of about 350 Hz and midband frequency of 425/450 Hz, respectively. The ratio of the clock frequency to the signal frequency to be received, i.e., to the midband frequency of the bandpass filter BP, is chosen here to be 50:1.

This clock frequency is also applied to the clock-frequency detector DT of the bandwidth switch BU via the clock line TL.

Figure 2:
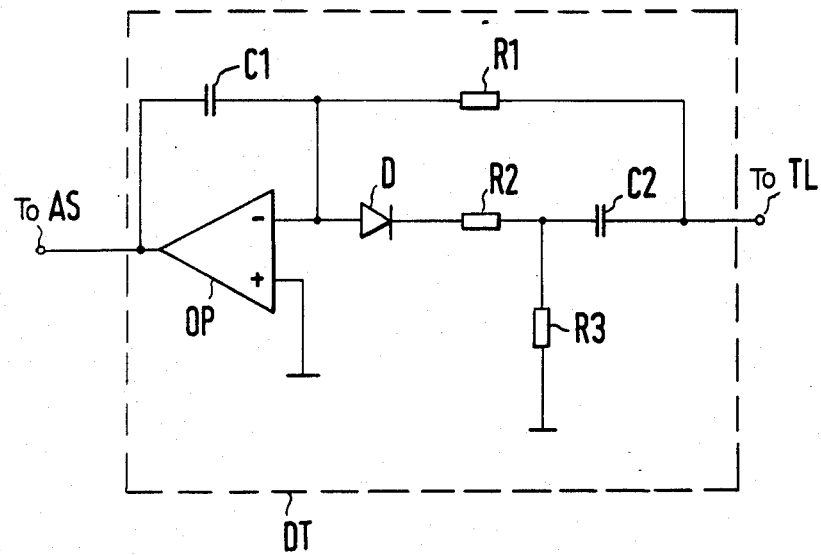
FIG. 2 shows an embodiment of the clock-frequency detector of the signalling receiver of FIG. 1.

First, the structure of the clock-frequency detector DT will be explained with the aid of FIG. 2. The detector includes an integrator C1, OP having its negative input connected to the clock line TL via a first resistor R1 on the one hand and via a series combination of a forward-biased diode D, a second resistor R2, and a differentiator C2, R3 on the other. The positive half-wave of the clock signal is applied to the integrator C1, OP through the first resistor R1, and the negative half-wave, namely a pulse of constant duration because of the differentiator R3, C2, through the second resistor R2 and the diode D. The values of the first resistor R1 and the second resistor R2 are chosen so that at the output of the integrator C1, OP, a negative voltage is developed for comparatively low clock frequencies (to set 25/50 Hz and 425/450 Hz), and a positive voltage for comparatively high clock frequencies (to set 16 kHz).

In the case of the outgoing call, i.e., 425/450 Hz, a negative voltage is applied to the analog switch array AS, so that resistors of the bandpass filter BP are switched by the analog switch array AS in such a way that a bandwidth complying with relevant telecommunication network standards is set. Likewise, resistors of the attenuator TG at the signal input E of the signalling receiver are switched by the analog switch array AS in such a way that an attenuation factor complying with relevant telecommunication network standards is set.

The AC voltage signal applied over the central-office trunk a, b to the signal input E (outgoing call, 425/450 Hz) passes through the attenuator DG to the variable high-pass filter HP. From the signal output A1, it is applied to the first input E1 of the pulse shaper IF. By the high-pass filter HP, essentially 16 ⅔-Hz and 50-Hz noise voltages are filtered out.

The pulse shaper IF is designed so that even the smallest applied signals are sufficient to produce an output pulse voltage. To prevent any unwanted voltages from being developed at the output of the pulse shaper IF as a result of residual noise voltages which were not filtered out by the high-pass filter HP, the pulse shaper IF is activated via the second threshold switch S2 only when the AC voltage signal to be received has exceeded a level determined by the first threshold switch S1. A charging capacitor in the first rectifier G1 ensures that the AC voltage signal to be received is maintained for at least one signal period. It is designed so that its time constant is equal to the longest signal period to be received.

If the pulse shaper IF is activated via its second input E2, its output A2 provides a square-wave signal of constant, input-signal-independent amplitude and of the signal frequency to be received, i.e., 425/450 Hz. Thus, the bandpass filter BP, which is tuned to the corresponding midband frequency, passes only the desired AC voltage signal independent of any noise voltages and attenuations on the central-office trunk a, b.

According to a further advantageous feature of the invention, the output of the bandpass filter BP is passed through a second rectifier G2 and coupled to the signal output A. The second rectifier G2 facilitates the subsequent digital processing of the signal. It is connected to the analog switch array AS of the bandwidth switch BU, so that time constants dependent on the clock frequencies detected by the clock-frequency detector DT are settable at the second rectifier G2.

For the case of an incoming call, i.e., 25/50-Hz AC voltage signals, the operation of the signalling receiver is analogous to that described above. The high-pass filter HP and the bandpass filter BP are controlled at a correspondingly lower clock frequency, so that a cutoff frequency of 20/40 Hz is set.

If 16-kHz metering pulses are to be received, the signalling receiver in accordance with the invention functions analogously. The high-pass filter HP and the bandpass filter BP are adjusted with a correspondingly higher clock frequency to a cutoff frequency of about 13 kHz and a midband frequency of 16 kHz, respectively. As a result of the comparatively high clock frequency, a positive voltage is now developed at the output of the clock-frequency detector DT. This causes the attenuator DG to be adjusted to a corresponding attenuation factor via the analog switch array AS, because, according to communications authority requirements, the threshold of response to 16-kHz signals is higher than the threshold of response to 425/450-Hz signals. In addition, a smaller bandwidth of the bandpass filter BP is adjusted via the analog switch array AS. Since the high-pass filter HP has a cutoff frequency of about 13 kHz, essentially the voice signal, which is applied simultaneously with the 16-kHz metering pulses, and noise signals due to longitudinal voltages are filtered out, thus preventing any interference with the operation of the first threshold switch SI and the pulse shaper IF. Furthermore, the time constant of the second rectifier G2 is so adjusted in accordance with the metering pulses to be received that subsequent digital processing is readily possible.

It will thus be seen that a signalling repeater has been provided which fulfills all of the above-mentioned objects. The present invention has been described above with regard to the structure, function and use of a presently contemplated specific embodiment of the invention. It should be appreciated by those skilled in the art that many modifications and variations are possible. Accordingly the exclusive rights afforded hereby should be broadly construed, limited only by the spirit and scope of the appended claims.

What is claimed is:

1. A signalling receiver for detecting a signal on a central-office trunk in a trunk junctor of a telephone system, said receiver comprising:
    a signal input;
    a signal output;
    a clock line;
    a variable bandpass filter connected to the clock line, the midfrequency of the bandpass filter being determined by the frequency of the clock signal;
    means for coupling the variable bandpass filter to the signal output;
    a variable high-pass filter connected to the clock line, the cutoff frequency of the high-pass filter also being determined by the frequency of the clock signal;
    an attenuator for coupling said signal input to said variable high-pass filter;
    a signal evaluation and conversion unit for coupling the high-pass filter to the variable bandpass filter; and a bandwidth switch coupled to the clock line, the variable band-pass filter, and the attenuator;

wherein:

the cutoff frequency of the high-pass frequency is always at the same relative distance from the midband frequency of the bandpass filter, and said cutoff frequency is always lower than said midband frequency.

2. A signalling receiver as claimed in claim 1, wherein the signal evaluation and conversion unit comprises:

a first threshold switch;

a second threshold switch;

a first rectifier connected in series between said first and second threshold switches, and a switchable pulse shaper having a control input responsive to an output of said second threshold switch and a signal input responsive to the output of the high-pass filter for producing a square-wave signal of the frequency to be received and of constant amplitude.

3. A signalling receiver as claimed in claim 2 wherein the bandwidth switch comprises:

an analog switch array, and a clock-frequency detector for coupling said analog switch array to the clock line;

the analog switch array is connected to the attenuator and the bandpass filter;

the resistance of the attenuator is switched in response to the clock frequency detected by the clock-frequency detector to adjust a corresponding attenuation factor, and the resistance of the bandpass filter is switched in response to said clock frequency to adjust a corresponding bandwidth.

4. A signalling receiver as claimed in claim 3, wherein the clock-frequency detector comprises:

a first resistor;

a forward-biased diode;

a second resistor;

a differentiator, and an integrator having its input connected to the clock line, both via said first resistor and also via a series combination of said forward biased diode, said second resistor, and said differentiator; and the resistance ratio of the two resistors is such that a negative voltage is developed at the output of the integrator for comparatively low clock frequencies and a positive voltage for comparatively high clock frequencies.

5. A signalling receiver as claimed in claim 3 wherein said means for coupling comprises a second rectifier connected to the analog switch array of the bandwidth switch, and time constants of the second rectifier are adjustable depending on the clock frequencies detected by the clock-frequency detector.

6. A signalling receiver as claimed in claim 1 wherein the high-pass filter and the bandpass filter are switch-capacitor filters.

* * * * *